(12) United States Patent
Endres et al.

(10) Patent No.: US 7,006,565 B1
(45) Date of Patent: Feb. 28, 2006

(54) HYBRID SOFT AND HARD DECISION FEEDBACK EQUALIZER

(75) Inventors: Thomas J Endres, Pipersville, PA (US); Samir N Hulyalkar, Plainsboro, NJ (US); Christopher H Strolle, Glenside, PA (US); Troy A Schaffer, Langhorne, PA (US); Anand M Shah, Yardley, PA (US)

(73) Assignee: ATI Technologies Inc., Ontario (CA)

( * ) Notice: Subject to any disclaimer, the term of this patent is extended or adjusted under 35 U.S.C. 154(b) by 0 days.

(21) Appl. No.: 09/549,368

(22) Filed: Apr. 14, 2000

Related U.S. Application Data (60) Provisional application No. 60/129,478, filed on Apr. 15, 1999.

(51) Int. Cl.
    *H03H 21/00*  (2006.01)

(52) U.S. Cl. ............... 375/233; 375/229; 375/232; 708/322; 708/323

(58) Field of Classification Search ........... 375/232, 375/261, 336, 321, 229, 295, 340, 341, 350, 375/233, 134, 133; 348/614; 370/208; 708/322, 708/323

See application file for complete search history.

(56) References Cited

U.S. PATENT DOCUMENTS

| | | | | |
|---|---|---|---|---|
| 5,363,408 A | * | 11/1994 | Paik et al. | 375/261 |
| 5,513,214 A | * | 4/1996 | Gozzo | 375/232 |
| 5,673,293 A | * | 9/1997 | Scarpa et al. | 375/321 |
| 5,848,105 A | * | 12/1998 | Gardner et al. | 375/336 |
| 5,872,815 A | * | 2/1999 | Strolle et al. | 375/321 |
| 6,289,046 B1 | * | 9/2001 | Takeuchi et al. | 375/232 |

OTHER PUBLICATIONS

J.R. Treichler, B.G. Agee, "A New Approach to Multi-path Correction of Constant Modulus Signals" IEEE Transactions on Acoustics Speech and Signal Processing, vol. ASSP-31, No. 2. p. 459-472 Apr. 1983.

\* cited by examiner

*Primary Examiner*—Young T. Tse
*Assistant Examiner*—Edith Chang
(74) *Attorney, Agent, or Firm*—Allan Jacobson (57) ABSTRACT

An equalizer for use in a communication receiver includes an infinite impulse response (IIR) feedback filter operated in acquisition and tracking feedback modes on a sample by sample basis to form a hybrid Decision Feedback Equalizer (DFE) architecture. In acquisition mode, soft decision samples from the filtered received signal are input to the IIR filter. In the tracking mode, hard decision samples from a slicer are input to the IIR filter. Acquisition and tracking operating modes are selected in accordance with a set of decision rules on a sample by sample basis based on the quality of the current hard decision. If the current hard decision is low quality, then the soft decision sample (acquisition mode) is used. If the current hard decision is high quality, then the hard decision sample (tracking mode) is used. In such manner, the DFE is operated in a hybrid mode, i.e., using both soft and hard decisions on a sample by sample basis. Furthermore, the decision rules that are responsive to signal reliability to select acquisition and tracking modes are adaptive.

18 Claims, 7 Drawing Sheets

HYBRID SOFT AND HARD DECISION FEEDBACK EQUALIZER

This application claims the benefit of U.S. Provisional Application No. 60/129,478, filed Apr. 15, 1999.

FIELD OF INVENTION

The present invention relates to equalizers in communication receivers, and more particularly, to the blind equalization of digitally-encoded samples which contain information in the magnitude and/or phase of the received signal, such as in the case of Pulse Amplitude Modulation (PAM) and Quadrature Amplitude Modulation (QAM).

BACKGROUND OF THE INVENTION

An equalizer is a device that compensates for signal distortions caused by the communication channel between a transmitter and a receiver in a communication system.

Digital transmission of information typically involves the modulation of pulses onto an RF carrier's amplitude and/or phase. Most propagation mediums (terrestrial, cable, underwater, etc.) introduce signal distortion. Factors that cause distortions include noise, signal strength variations, phase shift variations, multiple path delays, and the like.

Noise is also known as static. Signal strength variations are commonly known as fading. In addition, multiple different paths between the transmitter and receiver through the propagation medium cause multiple path delays, commonly known as multipath. The different paths have different delays that cause replicas of the same signal to arrive at different times at the receiver (like an echo). Multi-path distortion results in inter-symbol interference (ISI) in which weighted contributions of other symbols are added to the current symbol.

In addition to distortion and noise from the propagation medium, front-end portions of the receiver and transmitter also introduce distortion and noise. The presence of distortion, noise, fading and multi-path introduced by the overall communication channel (transmitter, receiver propagation medium), can cause digital systems to degrade or fail completely when the bit error rate exceeds some threshold and overcomes the error tolerance of the system.

Equalization

Digital systems transmit data as symbols having discrete levels of amplitude and/or phase. To the extent that a symbol is received at a level that differs from one of the allowed discrete levels, a measure of communication channel error can be detected.

The digital receiver uses a slicer to make hard decisions as to the value of the received signal. A slicer is a decision device responsive to the received signals at its input, which outputs the projection of the nearest symbol value from the grid of constellation points. The output of the slicer thus corresponds to the allowed discrete levels.

At the receiver, it is known to use an adaptive equalizer responsive to the detected error to mitigate the signal corruption introduced by the communications channel. It is not uncommon for the equalizer portion of a receiver integrated circuit to consume half of the integrated circuit area.

An equalizer is a filter that has the inverse characteristics of the communication channel. If the transmission characteristics of the communication channel are known or measured, then the equalization filter parameters can be set indirectly. After adjustment of the equalization filter parameters, the received signal is passed through the equalizer, which compensates for the non-ideal communication channel by introducing compensating "distortions" into the received signal which tend to cancel the distortions introduced by the communication channel.

However, in most situations such as in broadcasting, each receiver is in a unique location with respect to the transmitter. Accordingly, the characteristics of the communication channel are not known in advance, and may even change with time. In those situations where the communication channel is not characterized in advance, or changes with time, an adaptive equalizer is used. An adaptive equalizer has variable parameters that are calculated at the receiver. The problem to be solved in an adaptive equalizer is how to adjust the equalizer filter parameters in order to restore signal quality to a performance level that is acceptable by subsequent error correction decoding.

In some adaptive equalization systems, the parameters of the equalization filter are set using a predetermined reference signal (a training sequence), which is periodically sent from the transmitter to the receiver. The received training sequence is compared with the known training sequence to derive the parameters of the equalization filter. After several iterations of parameter settings derived from adaptation over successive training sequences, the equalization filter converges to a setting that tends to compensate for the distortion characteristics of the communications channel.

In blind equalization systems, the equalizer filter parameters are derived from the received signal itself without using a training sequence. In the prior art, it is known to adjust the equalizer parameters blindly using the Least Mean Squares (LMS) algorithm, in which the training symbols are replaced with hard decisions, or best estimates of the original input symbols. Blind equalization systems using LMS in this manner are referred to as decision directed LMS (DD-LMS).

However, the DD-LMS algorithm requires a good initial estimate of the input signal. For most realistic communication channel conditions, the lack of an initial signal estimate results in high decision error rates, which cause the successively calculated equalizer filter parameters to continue to fluctuate, rather than converge to a desired solution. The parameters are said to diverge in such a case.

It is also known to use another algorithm, called the Constant Modulus Algorithm (CMA), in serial combination with the DD-LMS algorithm from a cold start. See D. N. Godard, "Self-recovering equalization and carrier tracking in two-dimensional data communication systems," IEEE Transactions on Communications, vol. 28, no 11, pp. 1867–1875, October 1980, or J. R. Treichler, B. G. Agee, "An New Approach To Muli-Path Correction Of Constant Modulus Signals," IEEE Transactions On Acoustics Speech And Signal Processing, vol ASSP-31, no. 2, page 459–472 April 1983. The CMA algorithm is used first to calculate the equalizer filter parameters, which is regarded as an initial estimate. Thereafter, the equalizer filter parameters (as calculated by the CMA algorithm) are used in an acquisition mode to find the initial equalizer filter parameters to start the DD-LMS algorithm.

The CMA algorithm (as well as the DD-LMS algorithm) is usually implemented with a gradient descent strategy in which the equalizer parameters are adapted by replacing the present equalizer parameter settings with their current values plus an error (or correction) term. See C. R. Johnson, Jr., P. Schniter, T. J. Endres, J. D. Behm, D. R. Brown, R. A. Casas, "Blind equalization using the constant modulus criterion: a review," Proceedings of the IEEE, vol. 86, no. 10, pp. 1927–1950, October, 1998. The CMA error term itself is a cubic function of the equalizer output, and it minimizes via stochastic gradient descent a qaurtic function of the equalizer output.

A typical equalizer includes a forward equalizer filter and a decision feedback equalizer filter. From a cold start, the receiver enters an acquisition mode. In the acquisition mode, the CMA algorithm is used first to adjust the equalizer parameters. Then, after a fixed period of time (or alternatively based on a measure, which is derived from the equalizer output), the receiver switches to the DD-LMS algorithm in a tracking mode.

SUMMARY OF THE INVENTION

In accordance with the present invention, a linear infinite impulse response (IIR) feedback filter is operated in first and second feedback modes to form a hybrid decision feedback equalizer (DFE) architecture. In the first mode (also known as acquisition mode), soft decision samples from the filtered received signal are input to the IIR filter. In the second mode (also known as tracking mode), hard decision samples from a slicer are input to the IIR filter.

The first and second operating modes (acquisition and tracking) are selected in accordance with a set of decision rules on a sample by sample basis. As the operating mode is switched on a sample by sample basis, the error function and data used to form the update error term for the coefficients of the equalizer filter are also determined on a sample by sample basis. In addition, the decision rules that select the first and second operating modes for each sample are adaptive as well.

The decision rules used for selecting the operating mode of the hybrid DFE are based on determining the quality of the current hard decision. For each sample, a measure of the quality of the current hard decision is made. If it is determined that the current hard decision is low quality, then the soft decision sample (acquisition mode) is used. If it is determined that the current hard decision is high quality, then the hard decision sample (tracking mode) is used. In such manner, the DFE is operated in a hybrid mode, i.e., using both soft and hard decisions on a sample by sample basis.

In particular, defining a region (a square box) centered about the origin of the idealized signal constellation provides in part a measure of quality of the hard decision sample, since phase jitter more severely distorts symbols that are farther from the origin. For example, if the hard decision sample is within the box, i.e., closer to the origin, then the hard decision sample is more likely to be high quality than one far from the origin. Those hard decision samples inside a prescribed box must also be within a threshold distance of an idealized constellation point to be considered high quality. Conversely, if the hard decision sample is outside the box, i.e., further from the origin, or greater than a threshold distance from an idealized constellation point, then the hard decision sample is considered to be low quality.

When the quality of many of the hard decisions is considered to be low (as during initial signal acquisition), most or all of the signal samples are processed in the DFE using soft decisions. As the quality of the signal samples improves, more (or at least some) of the signal samples are processed in the DFE using hard decisions from the slicer. As the quality of the current hard decision continues to increase, more (or all) of the received signal samples are processed by the DFE using hard decisions from the slicer. When the received signal is locked in and strong, all of the samples for the DFE are hard decision samples from the slicer. If, for some reason after the receiver is locked and tracking, the signal quality of the hard decision samples should begin to decline, then the adaptive lower quality hard decision samples.

DETAILED DESCRIPTION

Figure 1:
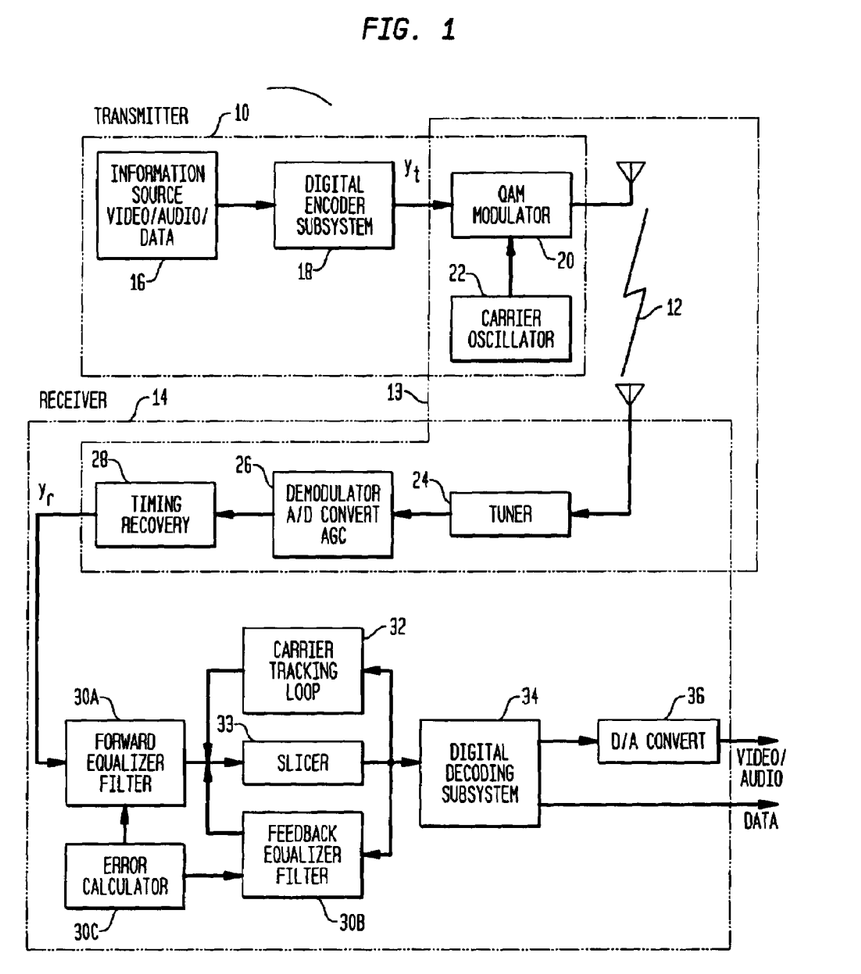
FIG. 1 is a block diagram of a digital communication system employing a hybrid soft and hard decision feedback equalizer in accordance with the present invention.

As shown in FIG. 1, a typical communications system has a transmitter station 10 and a receiver station 14, coupled together via a suitable propagation medium 12. The transmitter station 10 includes an information source 16 such as video, audio and/or data coupled to a digital encoding subsystem 18. The transmitted signal, $Y_t$, from the digital encoding subsystem 18 is coupled to QAM modulator 20, which modulates the signal $Y_t$ onto a suitable carrier frequency (provided by carrier oscillator 22) for transmission into the propagation medium 12.

The receiving station 14 includes a tuner 24, demodulator, A/D converter, and AGC (automatic gain control) functions 26, and a timing recovery module 28. The receiver timing recover module 28 reproduces the signal time slicing so that it is aligned with the signal in the transmitter. The receiving station 14 further includes a forward equalization filter 30A, a slicer 33, a feedback equalization filter 30B, an error term calculator 30C, digital decoding function 34 and a digital to analog (D/A) converter 36.

The system elements between the original signal $Y_t$ at the output of the digital encoding subsystem 18 in the transmitter 10 up to the recovered output signal $Y_r$ from the timing recovery module 28 in the receiver is regarded as the overall communication channel 13. The function of the forward equalizer 30A, feedback equalizer 30B and associated error term calculator 30C in the receiver 14 is to compensate for distortion and noise originating anywhere in the overall communication channel 13.

In operation, the tuner 24 selects an appropriate carrier frequency for the propagation medium 12. The output of tuner 24 is converted to digital samples in an A/D converter and demodulated 26 to in-phase and quadrature phase components in the correct frequency range. Also, the AGC 26 feedback loop automatically adjusts the receiver gain level. The timing recovery function 28 pulls the local crystal oscillator that governs the A/D sampling clock into phase lock with the transmitted symbols. The recovered signal, $Y_r$, that is output from the timing recovery module 28 is input to the forward equalizer 30A.

The equalizer filters 30A, 30B operate in conjunction with a carrier tracking loop 32 that pulls the receiver local crystal oscillator into precise carrier frequency and phase lock with the transmitter oscillator. The error term calculator 30C is responsive to the input and output of the slicer 33 and the carrier tracking loop 32 to generate update error terms to update the filter coefficients of the forward and feedback equalization filters 30A, 30B. Data bit estimates at the output of slicer 33 are provided to the error correction decoder in the digital decoding subsystem 34. After error correction decoding 34, the digital data is recovered, and reproductions of the original video and audio (from D/A converter 36) and data are output from the receiver 14. The present invention is embodied in the forward equalizer filter 30A, feedback equalizer filter 30B and error term calculator 30C portions of the communication receiver 14.

Passband and Baseband Equalization

Figure 2:
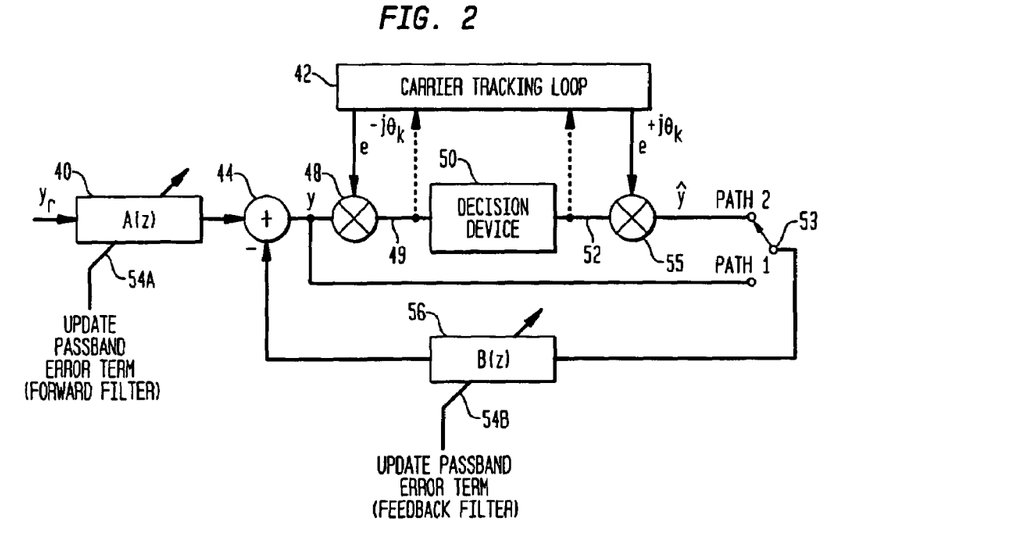
FIG. 2 is a block diagram of an equalizer and carrier recovery module for a digital communication receiver in accordance with the present invention.
Figure 3:
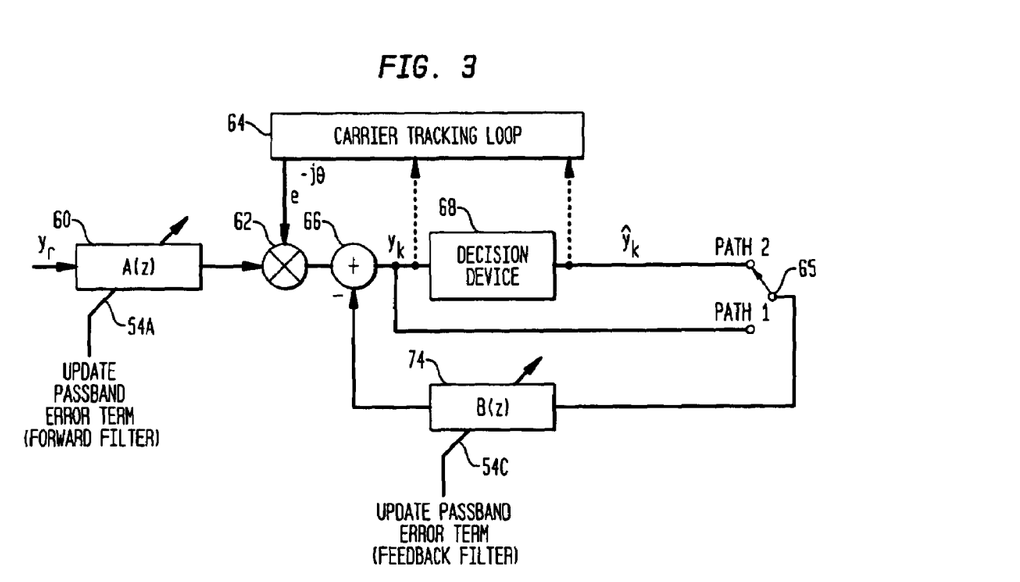
FIG. 3 is a block diagram of a second embodiment of an equalizer and carrier recovery module for a digital communication receiver in accordance with the present invention.

Further details of the forward (30A) and feedback (30B) equalizer filters, adaptive slicer 33 and carrier recovery 32 portions of FIG. 1 are shown in FIGS. 2 and 3. The difference between the embodiments of FIGS. 2 and 3 is that in FIG. 2, feedback equalization (filter 56) is performed at passband, while in FIG. 3, feedback equalization (filter 74) is performed at baseband.

For FIG. 2, the received signal $Y_r$ at the receiver is input to the forward equalizer filter 40, which is typically implemented as a finite impulse response (FIR) filter. The output of the forward equalizer filter 40 is input to an adder 44, after which a mixer (multiplier) 48 acts as a de-rotator to translate the processed $Y_r$ signal to baseband frequency (DC).

Received signal samples $Y_K$ at the output 49 of the mixer 48 are coupled to decision device (slicer) 50. The decision levels of slicer 50 are typically set for nominal decision threshold levels that correspond to each symbol in the expected QAM constellation. The input $Y_K$ to the slicer 50 represents the actual received signal levels, which have been filtered 40 and de-rotated 48. After the slicer 50, the output signal 52, $Y\hat{}_K$ represents hard decision levels of the received signal $Y_K$, which correspond to the expected signal levels of the QAM signal. In order to provide input for feedback equalization at passband to filter 56, the baseband output signal $Y\hat{}_K$ is re-rotated back to passband in mixer 55.

The carrier-tracking loop 42 internally comprises a phase detector, an internal loop filter and an internal sine/cosine generator. In combination with multiplier 48, the carrier-tracking loop 42 is a closed loop feedback system for recovering the frequency and phase of the carrier signal. The phase difference between input signals 49 and output signals 52 of slicer 50 is detected in the carrier-tracking loop 42. The detected phase difference is filtered in the internal loop filter, which controls the frequency and phase of the internal sine/cosine generator. The detected phase error changes the frequency of the generated sine wave in a direction so as to reduce the detected phase difference between the input signals to the internal phase detector. At steady state frequency lock, the carrier-tracking loop 42 outputs sinusoidal signals ($e^{-j\theta(k)}$) to de-rotator 48 and ($e^{+j\theta(k)}$) to re-rotator 55 which tracks the input carrier frequency and phase.

Both input $Y_K$ and output $Y\hat{}_K$ signals from the slicer 50 are used to calculate respective update passband error terms 54A, 54B for the forward equalization filter 40 and the feedback equalization filter 56 respectively. A switch 53 selects either soft decision samples, (Y in FIG. 2 or $Y_K$ in FIG. 3) in the acquisition position, and hard decision samples, $Y\hat{}_K$, in the tracking position. In accordance with the present invention, switch 53 is set to select either hard decision samples or soft decision samples on a sample by sample basis based on a measure of the quality of the hard decision samples from the decision device 50.

The embodiments of FIGS. 2 and 3 share many common features. The forward filter 40, carrier-tracking loop 42, de-rotator 48, adder 44, slicer 50, feedback filter 56 and switch 53 in FIG. 2 are analogous to forward filter 60, carrier-tracking loop 64, de-rotator 62, adder 66, slicer 68, feedback filter 74 and switch 65, respectively in FIG. 3. The differences are that in FIG. 2, the order of the adder 44 and de-rotator 48 are reversed as compared to the respective order of adder 66 and de-rotator 62 in FIG. 3. Additionally in FIG. 2, the data output from the slicer 50 is re-rotated by mixer 55 so that feedback filter 56 operates at passband as compared to the feedback filter 74 in FIG. 3, which operates at baseband. Baseband feedback operation can use lower precision arithmetic than passband feedback. The feedback equalizer 74 is implemented using a finite impulse response (FIR) filter imbedded in a feedback loop which makes the overall loop have an infinite impulse response (IIR). In both FIGS. 2 and 3, the present invention relates to the use of a switch to select either hard decision samples or soft decision samples on a sample by sample basis.

A DFE provides superior inter-symbol interference suppression compared to a forward FIR equalizer. However, because a DFE filter needs a suitable-method of blind initialization when the signal is closed-eye and with imprecise carrier lock, a linear IIR filter structure is used for signal acquisition, which is then traditionally hard-switched to a nonlinear DFE filter for signal tracking. For example, the following method of operation for FIG. 3 (baseband) applies equally well for FIG. 2 (passband). From a cold start, switch 65 is initially set in the acquisition position (path 1). For signal acquisition, the equalizer algorithm is initially set for CMA operation. Once a good initial estimate of the equalizer parameters is obtained by using the CMA algorithm to adjust the equalizer filter parameters, switch 65 is set to tracking position (path 2) using the LMS algorithm. In accordance with the present invention, however, filter 74 is operated in a hybrid mode either as an IIR filter using a soft decision sample and CMA, or as a DFE filter using a hard decision sample and LMS, on a sample by sample basis.

Signal Acquisition

During the acquisition mode, path 1 is selected in FIG. 2 so that a linear, IIR structure is used. Though B(z) is a FIR filter, it is embedded in a feedback loop which results in an overall infinite impulse response. The equalizer parameters are adapted from a cold-start initialization (for example, $A(z)=[0\ 0\ \ldots\ 0\ 1\ 0\ \ldots\ 0]^T$ and $B(z)=[0\ 0\ \ldots\ 0]^T$) using the stochastic gradient descent search rule, $$A(k+1)=A(k)+\mu R^*(k) e(k)$$

$$B(K+1)=B(k)+\mu Z^*(k) e(k)$$

The CMA update error term is used for the acquisition mode, or $e(k)=e_{cma}(k)$, $$e_{cma}(k)=y(k)(\gamma-|y(k)|^2).$$

The stepsize $\mu$ is a small, positive, constant. $R(k)=[r(k) r(k-1) \ldots r(k-M+1)]^T$ is a regressor vector of (filtered) inputs to length-M $A(z)$, and $Z(k)=[z(k-1) z(k-2) \ldots z(k-N)]^T$ is a regressor vector of (filtered) inputs to length-N $B(z)$. (While in linear IIR mode, additional filtering is sometimes used for the regressor data in the adaptation process to guarantee local stability. If no additional regressor filtering is used, then $Z(k)=[y(k-1) y(k-2) \ldots y(k-N)]^T$.)

Note that there exist a variety of modifications to CMA in the literature and patent base. In the present embodiment, we mean "CMA" to include the update equation as described by Godard and written above, as well as those publicly known variants to the standard CMA update.

While using CMA to update the equalizer parameters, the carrier tracking loop can be operated in a coarse fashion instead of a decision-directed mode by treating the signal as if it is from a QPSK constellation. That is, the carrier tracking loop attempts to force the phase of the sample to a multiple of $\pi/4$.

Signal Tracking

The switch 53 in FIG. 2 is set to path 2 and a nonlinear DFE structure is used. The equalizer is said to be in a tracking mode. The path 2 branch contains a de-rotator 49 and re-rotator 55 in order to accomplish the slicing (with the decision device) on a baseband, rather than passband, sample. For example, the passband equalizer output sample, $y(k)$, is multiplied by the estimate of the carrier offset $e^{-j\theta(k)}$ at the first mixer 49 to form the baseband soft decision (or input to the decision device). The output of the decision device 50 (or hard decision) is a baseband sample and is re-rotated to passband by multiplication with $e^{+j\theta(k)}$ at the second mixer 55 to form the sample y^(k).

Equalizer parameter adaptation is done using the DD-LMS error term, and the adaptive filters are adjusted according to the rules given for $A(k+1)$ and $B(k+1)$ above, but instead of the CMA update error term used in the acquisition mode, the tracking mode uses the DD-LMS update error term, or $e(k)=e_{lms}(k)$, $$e_{lms}(k)=\hat{y}(k)-y(k).$$

The regressor vector $Z(k)=[\hat{y}(k-1) \hat{y}(k-2) \ldots \hat{y}(k-N)]^T$ is now comprised of hard-decisions rather than (filtered) soft decisions. No additional regressor filtering is required to guarantee stability.

The carrier tracking loop is operated in a standard decision directed (DD) fashion. An estimate of the instantaneous phase offset is derived from the baseband soft and hard decisions, filtered, and used to generate the sine and cosine terms needed for derotation and re-rotation.

In FIG. 3, $y(k)$ and $\hat{y}(k)$ are baseband samples. Hence the baseband CMA and DD-LMS error terms are given by the equations for $e_{cma}(k)$ and $e_{lms}(k)$ above, respectively. These baseband error terms are rotated to form passband versions of each ($e_{pb}(k)=e_{bb}(k)e^{j\theta(k)}$). The FIR filter $A(z)$ is updated with passband error terms, and the DFE filter $B(z)$ is updated with baseband error terms.

Typically, the receiver switches from acquisition to tracking modes after a prescribed number of iterations (signal samples) or responsive to an estimate of the signal to noise ration at the equalizer output. A DFE updated by the DD-LMS algorithm is supposed to track time variations in the signaling environment. In the event of a loss of signal lock due to rapid time variations in the signaling environment, a reset condition is declared, and a cold-start re-initialization using CMA is again used to acquire a good initial estimate for the DD-LMS algorithm. The current invention provides for an automatic re-initialization/re-acquisition in the event of signal loss by automatically going to a linear IIR structure with soft decisions input to the feedback filter that is updated using CMA.

Decision Rules

In FIGS. 2 and 3, the carrier loop (42, 64) can be coarse tuned during signal acquisition by treating the received sample as if it were an idealized point in a QPSK constellation. The coarse carrier loop tuning causes a rotation of the received QPSK constellation, which introduces phase error in the equalizer output sample. Moreover, most consumer-grade tuners and amplifiers introduce phase noise internally. The result of these phase distortions is that the equalizer output sample is in general not reliable during the acquisition mode.

Figure 4:
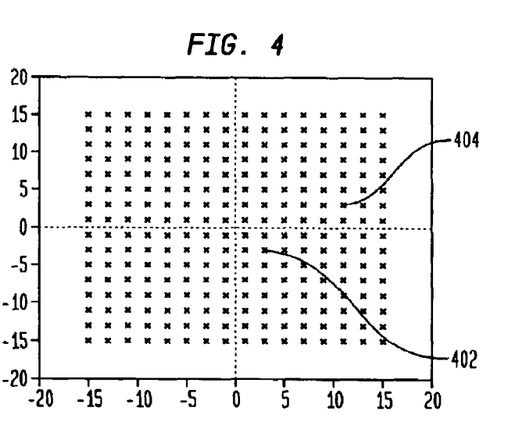
FIG. 4 illustrates an undistorted idealized signal constellation for a 256 symbol, 16 level QAM system.

For example, an idealized 256-QAM constellation is shown in FIG. 4. The quadrature component (Q) of the symbol value is plotted on the horizontal axis. The in-phase (I) component of the symbol value is plotted on the horizontal axis. The "x" marks at the constellation points are mathematical points in a complex plane, representing an idealized, clean, undistorted noise free signal. The decision rules for a given signal sample are based on the distance of that sample from the origin (0,0). For discussion purposes, two constellation points with different distances from the origin (0,0) are referenced. In particular, point 404 is relatively further from the origin (0,0) than point 402, which is relatively closer to the origin (0,0).

Figure 5A:
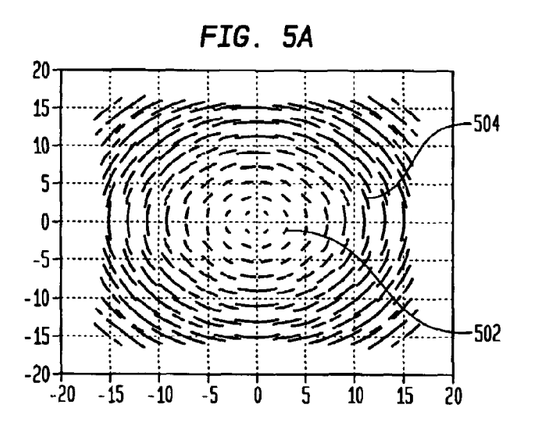
FIG. 5A illustrates the phase distortion effect of phase noise on the received signal constellation for a 256 symbol, 16 level QAM system.
Figure 5B:
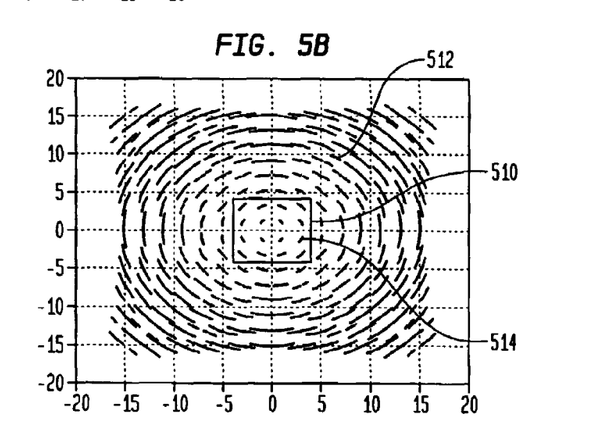
FIG. 5B illustrates a method for defining a box region about the origin of a signal constellation for a 256 symbol, 16 level QAM signal for the purpose of measuring signal quality in the presence of phase distortion for use in conjunction with the equalizer filter of the present invention.

In FIGS. 5A and 5B, an actual 256-QAM constellation is represented in a receiver when phase noise is introduced. The phase noise causes +/−1.5 degree rotation of the 256-QAM constellation about the origin (0,0). The phase distortion has statistics that are equally probable over the (−1.5, +1.5) degrees, and is denoted by the random variable $\phi$ (k). FIGS. 5A and 5B plot 5000 samples from $s(k)*e^{j\phi(k)}$, where $s(k)$ is a symbol value from FIG. 4.

As indicated, the phase noise in the 5000 samples causes a circular (angular) jitter of the 256-QAM constellation, resulting in a locus of constellation points representing the same symbol, which lie on an arc having a substantially constant radius from the origin (0,0). The nearer a constellation point is to the origin (0,0), the less the "spreading" of the locus of constellation point. The further a constellation point is from the origin (0,0), the more the "spreading" of the locus of constellation points. As a result, in FIGS. 5A and 5B, the inner symbol values 502, 514 nearer the origin (0,0) are distorted less than the outer symbol values 504, 512 further from the origin (0,0). In particular, the 16 innermost symbols of 256-QAM samples, which are corrupted by equally probable phase distortions over (−1.5, 1.5) degrees, can be reliably decoded. The square box decision region 510 encompasses the 16 innermost symbol values, where reliable hard decisions can be made. Reliable hard decisions cannot be made for the outermost samples outside of the square box decision region 510. The square decision box 510 centered about the origin has width w=8 so that its boundaries (w/2=4) fall midway between I or Q symbol values (3,5).

In such manner, the position of a given sample in the constellation helps determine whether a reliable hard decision can be made based on that sample. The square box decision region 510 provides a basis for a decision rule as to when a reliable hard decision can be made. When the current sample is within the square decision region 510 and the LMS error is below a threshold, t, then reliable hard decisions can be made, the DD-LMS update equation is used, and hard decisions from the slicer are feedback to the equalizer filter B(z) (path 2 in FIGS. 2 and 3). Conversely, when the current sample is outside the square decision region 510 or the LMS error is at or above the threshold, t, then hard decisions are unreliable, the CMA update equation is used, and soft decisions from the received signal input are fed back to the filter B(z).

Figure 6:
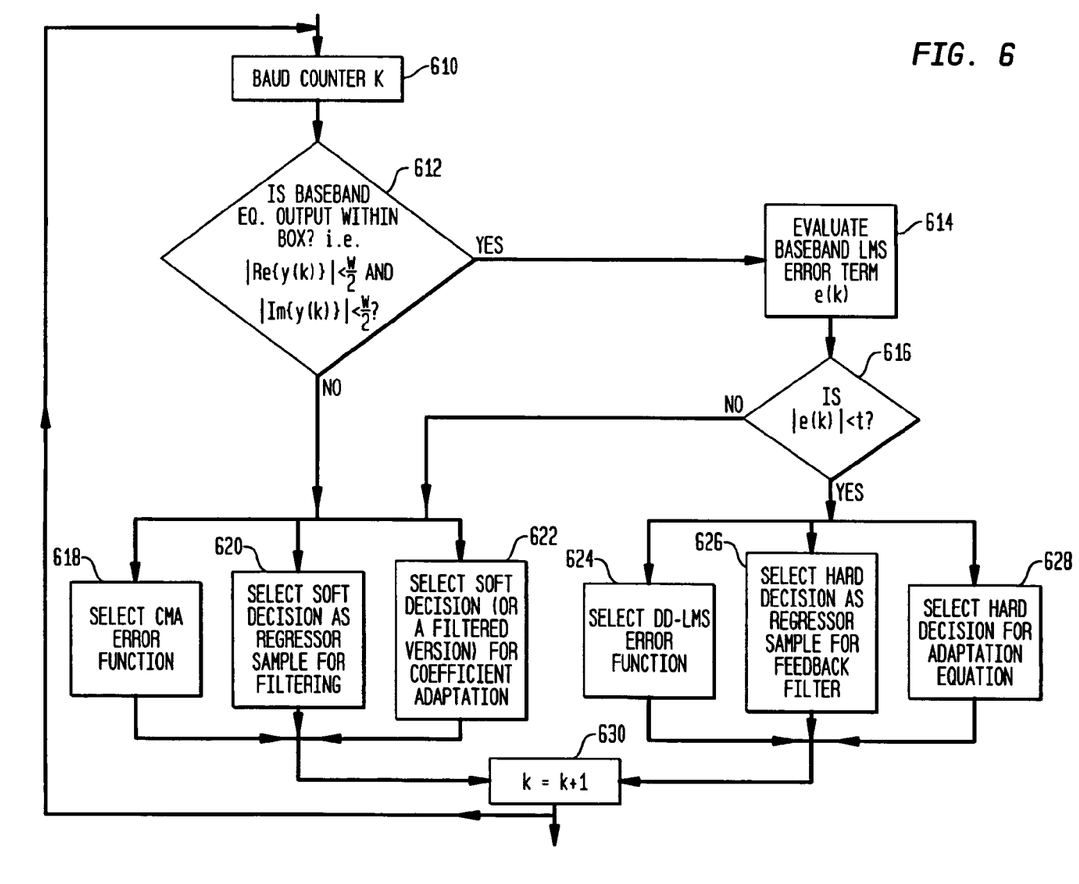
FIGS. 6–8 are flow chart diagrams illustrating the decision rules for operation of a hybrid soft and hard decision feedback equalizer in accordance with the present invention.

Although the outermost constellation points are least reliable because they have the most phase error, the CMA algorithm is immune to phase error. Thus, on a sample by sample basis either a linear IIR loop is updated with CMA or a nonlinear DFE loop is updated with DD-LMS. The regressor vector for the feedback filter is thus a hybrid, potentially containing a mixture of soft and hard decisions. For example, the regressor may look like Y(k)=[y^(k−1) y(k−2) y(k−3) y^(k−4) y^(k−5) ... y(k−N)]$^T$. The switches 53 and 65 in FIGS. 2 and 3 respectively, are essentially toggled by above decision rules. In addition, the size of the decision box 510, which governs the switch positions, is adaptively selected. Equalizer coefficient parameter adaptation is on a sample by sample basis, selecting between a linear IIR loop using CMA or a nonlinear DFE loop using DD-LMS. The flow chart in FIG. 6 shows the selection of the appropriate data sample and update rule used in the equalizer coefficient parameter adaptation.

Initially, the decision box size (510 in FIG. 5) is set to w/2=2, so that only the innermost points of the constellation are contained within the initial decision box. The flow diagram of FIG. 6 is entered for each occurrence of the baud clock at step 610, i.e., for every symbol. Then it is determined at step 612 whether or not the current sample falls within the square decision box. If the current sample is not within the square decision box, then CMA is selected for the error function at step 618 and a soft decision is selected as the regressor sample for filtering at step 620. At the same time, a soft decision (or a filtered version) is selected for coefficient adaptation at step 622. CMA equalization using soft decision samples corresponds to the signal acquisition phase of the receiver. The baud counter index, k, is incremented at step 630 and the selection process repeats at step 610. The size (w) of the decision box may be altered at this point.

Figure 9A:
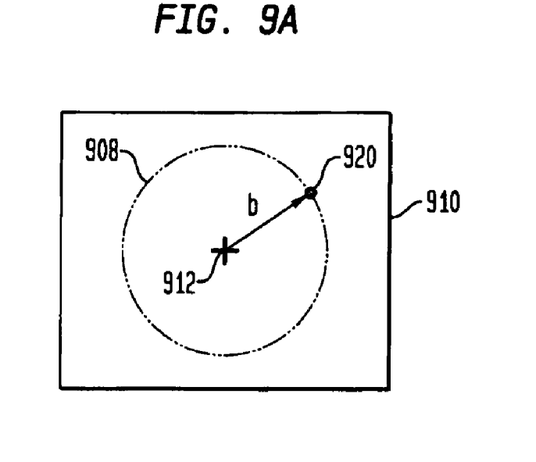
FIG. 9A illustrates a circular reliability region surrounding a point in the QAM constellation.
Figure 9B:
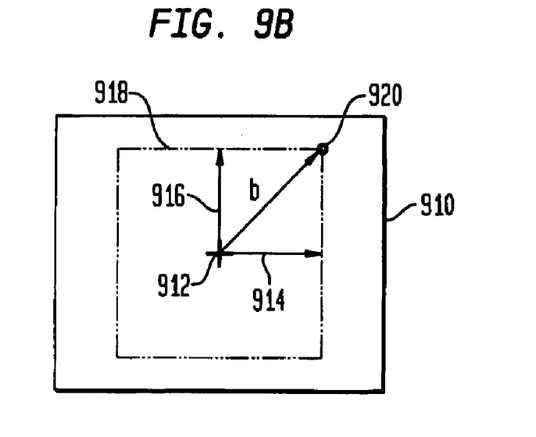
FIG. 9B illustrates a square reliability region surrounding a point in the QAM constellation.

For each sample that falls within the square decision box as determined at step 612, the baseband LMS error term, e(k), is computed at step 614. The I and Q components of the baseband error term are compared to the threshold parameter, t. FIGS. 9A and 9B illustrate two embodiments for comparing the LMS error term to the threshold parameter, t.

Each constellation point 912 has a "decision region" 910 and a "reliability region" 908, 918 (also called a "reliability area") associated with such constellation point 912. Any soft decision 920 that falls within the decision region 908, 918 of a given constellation point 912 is assigned the hard decision corresponding to the value of the given constellation point 912. The decision region 910 for a single constellation point 912 is normalized to have a dimension which is 2-by-2—the symbol values have a spacing of 2, as in {+/−1, +/−3, +−/5 ... }. The decision region further includes a circle of radius b (the reliability region in FIG. 9A) used to determine the reliability of the current equalizer output sample by updating a counter if |e$_{lms}$(k)|<b. The maximum radius, b, of the reliability region is b=1, a condition which occurs when the reliability region 908 is expanded to touch the boundary of the decision region 910.

The reliability area, centered about a valid constellation point 912, represents the error threshold error. If the sample falls within the reliability area (whether a circle or box), it is said to be reliable. In the case of a circular reliability area (FIG. 9A), a radius, b, is computed from the in-phase and quadrature components of the calculated error and compared to the radius of the reliability area 918. If the computed radius, $(e_I^2+e_I^2)^{1/2}$<t, then the sample is within the reliability area 908. In the case of square box reliability area (FIG. 9B), the in-phase (I) 914 and quadrature phase (Q) 916 components of the calculated error are compared to the magnitude of the length of one side of the reliability area 918. If |e$_I$|<t, and |e$_Q$|<t, then the sample is within the reliability area 918.

If the absolute value of the error is relatively small, i.e., if |e(k)|<t, then the decision is said to be reliable. In such case, (i) the DD-LMS error term is selected at step 624, (ii) a hard decision is fed back to the filter B(z) for the filtering operation at step 626, and (iii) a hard decision is used in the parameter adaptation equation at step 628. DD-LMS=equalization using hard decision samples corresponds to the tracking phase of the receiver.

On the other hand, if the computed LMS error term is relatively large, (i.e., if |e(k)|>=t) at step 616, then the decision is said to be unreliable. In this case, (i) the CMA error term is used 618, (ii) a soft decision is fed back to the filter B(z) for the filtering operation 620, and (iii) a soft decision or a filtered version of the soft decision is used in the parameter adaptation equation 622. The baud counter index, k, is incremented at step 630 and the selection process repeats at step 610. As before, the size of the decision box may be altered at this point.

An alternative to the present embodiment is to assign a control bit to each element of the hybrid-regressor vector in the adaptation process. If a soft decision is used, then the control bit is assigned a 0; if a hard decision is used, then the control bit is assigned a 1. As the regressor sample ripples through the hybrid tapped-delay-line with each baud iteration, those samples with a 0-valued control bit get updated using the current CMA error term while those samples with a 1-valued control bit get updated using the current LMS error term. In this way, a soft decision is always linked with the CMA error term, while a hard decision is always linked with an LMS error term.

Adaptive Decision Rules

As described above, the reliability of the current symbol estimate is determined based on its proximity to the origin (0,0) of the QAM constellation. Reliability is measured by comparing the I and Q components of the sample to the square decision box width, w, and also by comparing the magnitude of the I and Q components of the DD-LMS error term to a threshold parameter, t. The measured reliability is used to select the update error rule and to select whether a hard or soft data sample is used in the filtering and coefficient adaptation processes. The parameters w and t determine whether a given sample is deemed reliable or not. However, instead of being fixed, the parameters t and w are both time-varying parameters, i.e., threshold parameter t=t(k) and box-width parameter, w=w(k), respectively.

In accordance with an adaptation rule, the current value of t$_i$(k) is selected among i=0 ... P−1 choices which are stored in vector T=[t$_0$ t$_1$ t$_2$− ... t$_{P-1}$,]$^T$ and the current value of w$_i$(k)

is selected among i=0 . . . P−1 choices which are stored in vector W=[$w_0$ $w_1$ $w_2$- . . . $w_{P-1}$]$^T$. While the coefficient parameter adaptation is carried out in accordance with FIG. 6, the selection of the box width $w_i(k)$ and threshold $t_i(k)$ parameters are determined by the current index setting, i=0 . . . P−1.

The index, i, is initialized to i=0. Thereafter, the index, i, is adapted by evaluating a number of past equalizer samples, which is termed a BLOCK. For example, the last 100 equalizer samples form a BLOCK=100. A counter is used to estimate the reliability of the previous BLOCK output samples. Based on the reliability estimates of the previous BLOCK, the parameters, w and t, of the hybrid soft/hard equalization process are adapted by adapting the index, i.

The interior of the circle having a radius b is called the reliability area because the reliability of the BLOCK samples is based on the relative number of samples that fall inside the circle area compared to those samples that fall outside the circle area. (Alternatively, the reliability region could be defined as a square box instead of a circle.)

Figure 7:
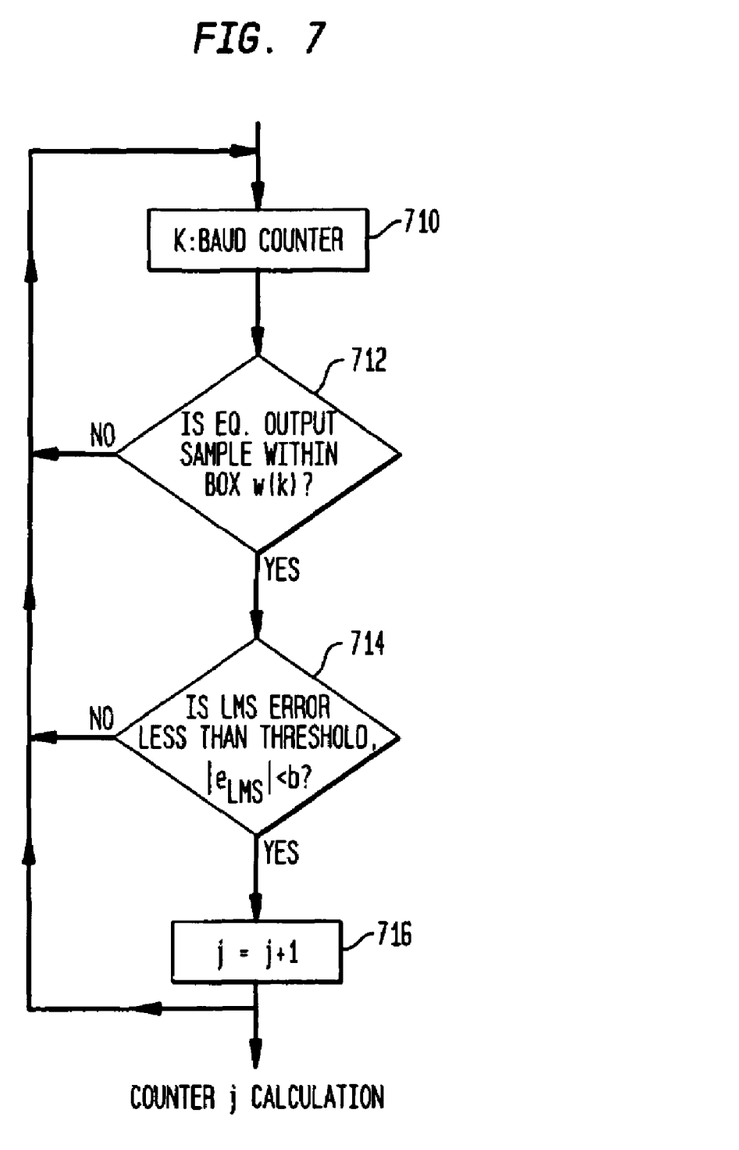
Figure 8:
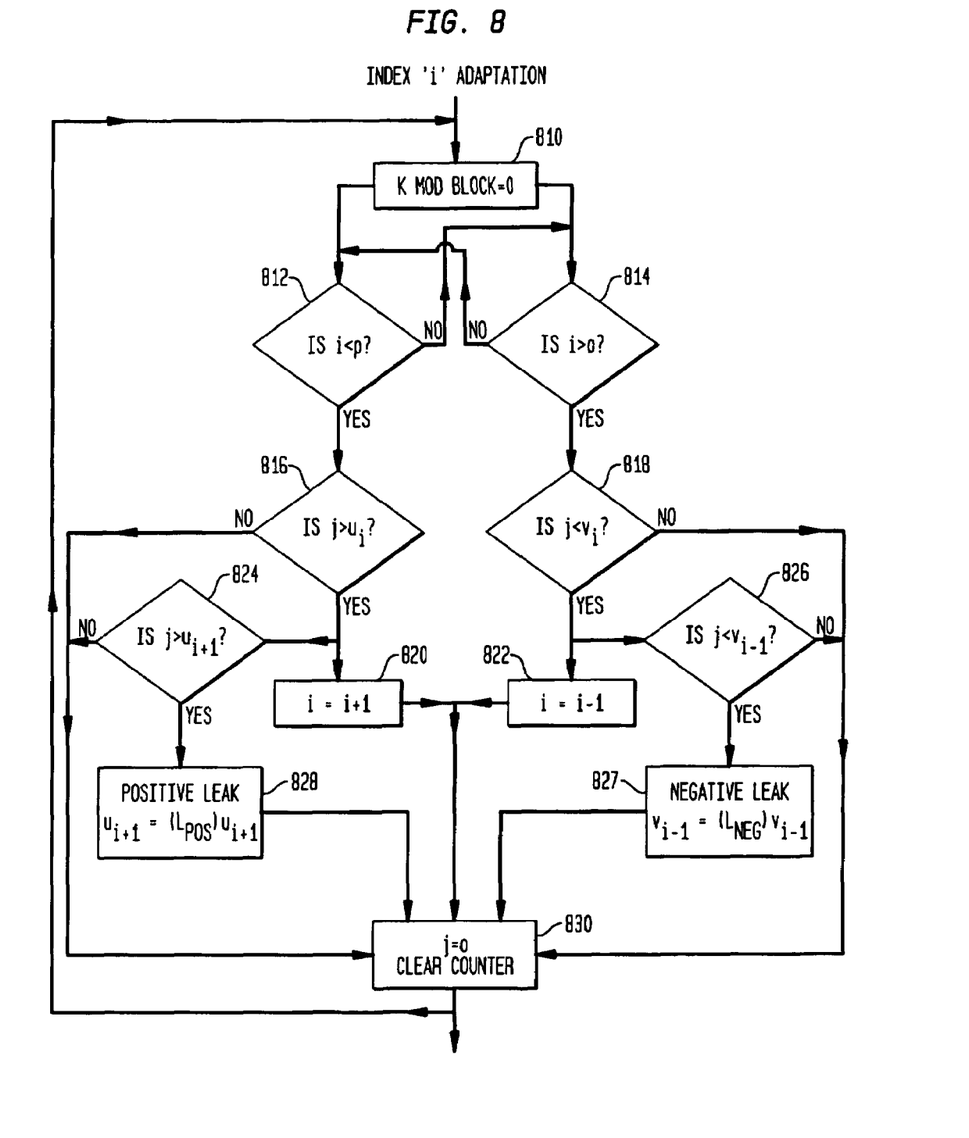

The flow charts of FIGS. 7 and 8 show how the adjustment of the index, i, is derived from the counter j. In FIG. 7, a value of j is calculated for a block of BLOCK samples by counting those samples whose LMS error term is within radius b. The flow chart of FIG. 8 also illustrates a "leaky" adjustment of the parameters stored in vectors U(k) and V(k).

As shown in FIG. 7, the calculation of j is derived from a simple counter. The flow diagram is entered for each occurrence of the baud clock at step 710, i.e., for every symbol. For each equalizer output sample, y(k), the sample is compared to the box width $w_i(k)$ at step 712. If the sample is not within the box with width $w_i(k)$, then counter j is not incremented, or j(k+1)=j(k). However, if y(k) falls within the box defined by $w_i(k)$ at step 712, then the LMS error term associated with y(k) is compared to the threshold parameter b, at step 714. If the LMS error term has magnitude less than b at step 714, then the decision is said to be reliable and the counter j is incremented at step 716, or j(k+1)=j(k)+1. The vector W(k) is selected as (not strictly) monotonically increasing, for example W=[4 4 6 6 8 8 10 10 12 12 14 14 16 16]$^T$ for 256-QAM signaling. Double indexing (or repeating of each entry) is used to provide an inherent self check in the adaptation strategy.

The value of j(k) calculated based on BLOCK samples is used to adapt the index i. The index, i, addresses the vectors T(k), U(k), V(k), W(k) to select the elements $t_i(k)$, $u_i(k)$ $v_i(k)$, and $w_i(k)$ for i=0 . . . P−1.

FIG. 8 shows a flow chart for the adaptation of index i, which is initialized to 0. The flow diagram is entered for each occurrence of the baud clock at step 810, i.e., for every symbol. FIG. 8 is symmetric about a vertical axis. The left side of the flow chart 812, 816, 820, 824, 843 corresponds to the case when i is incremented (step 820), while the right side of the flow chart 814, 818, 822, 826, 827 corresponds to the case when, i, is decremented (step 822). The current value of i is compared to 0 (step 812) and to P−1 (step 814) in order to determine if the algorithm is at the end of the vectors.

Vector U(k) contains threshold parameters for the counter j(k). If j(k) is greater than $u_i(k)$, then it is assumed that the equalizer has reached a setting so that the inner-most constellation points which fall within w(k) can be accurately decoded. The counter i is incremented 820 so that the box width w(k) is increased. Outer constellation points will thus be tested in deriving the reliability counter j in FIG. 7. An initial setting for 256-QAM signaling with symbol values {+/−1, +/−3, +/−5, . . . +/−15} (and BLOCK=1000,) for U is U(0)=[2$^2$*2 2$^2$*3 4$^2$*2 4$^2$*3 6$^2$*2 6$^2$*3 8$^2$*2 8$^2$*3 10$^2$*2 10$^2$*3 12$^2$*2 12$^2$*3 14$^2$*2 14$^2$*3 16$^2$*2 16$^2$*3]T. (This choice weights the entries by the number of constellation points (x) which fall within the box defined by $w_i$ and provides an inherent self-check in the adaptation strategy by testing first 2x and then 3x.)

On the right side of FIG. 8, the current value of j(k) obtained for the BLOCK of data samples in FIG. 7 is compared 818 to the element of vector V(k) selected by index i, or $v_i(k)$. If j(k) is less than the threshold $v_i(k)$, then the equalization is considered poor. The counter i is therefore decremented 822. The box width $w_i(k)$ is reduced, so that counter j is to be derived from constellation points which are closer to the origin. An initial setting for 256-QAM signaling with symbol values {+/−1, +/−3, +/−5, . . . +/−15} (and BLOCK=1000,) for V is V(0)=[0 0 2$^2$*2 2$^2$*3 4$^2$*2 4$^2$*3 6$^2$*2 6$^2$*3 8$^2$*2 8$^2$*3 10$^2$*2 10$^2$*3 12$^2$*2 12$^2$*3 14$^2$*2 14$^2$*3]$^T$. (Essentially, $v_i=u_{i-2}$, with the double-indexing considered.)

The thresholding parameter $t_i$ selects the style of equalizer coefficient adaptation (IIR-CMA or DFE-LMS) by comparison with the baseband DD-LMS error term (in FIG. 6). For example, T=[¾ ½ ¾ ½ ¾ ½ ¾ ½ ¾ ½ ¾ ½ ¾ ½ ¾ ½]$^T$. Hence, the threshold parameter adaptation scheme has a "self-check" which before the box width $w_i$ is changed, the threshold parameter $t_i$ is reduced and the reliability number $u_i$ is increased. The self-check feature provides a smooth, reliable transfer among box-widths $w_i$. However, in the event that the initial settings for vectors U and V are poor for the unknown signaling characteristics, "leakage" methods are provided, similar to that proposed in "Blended CMA: Smooth, adaptive transfer from LMS to CMA," L. R. Litwin, M. D. Zoltowski, T. J. Endres, S. N. Hulyalkar, Wireless Communications and Networking Conference, New Orleans, La., Sep. 21–24, 1999, which automatically adjust the elements of vector U and V over time. Alternatively, vectors T and W can also be "leaked."

In the bottom portion of both the left 828 and right 827 sides of FIG. 8b, the counter j(k) is compared to adjacent samples $u_{i+1}(k)$ and $v_{i-1}(k)$ of the current index i in vectors U(k) and V(k), respectively. If j(k) is greater than $u_{i+1}(k)$, then $u_{i+1}(k)$ is assumed to be too small and is "positively leaked" by multiplying it with $L_{pos}$, where $L_{pos}$>1, for example, $L_{pos}$=1.05. On the other hand, if j(k) is less than $v_{i-1}(k)$, then $v_{i-1}(k)$ is assumed to be too large and is "negatively leaked" by multiplying it with $L_{neg}$, where $L_{neg}$<1, for example, $L_{neg}$=0.95. Finally, the counter j is set to zero at step 830 and w is set equal to w[i] before returning to the process of FIG. 7. In practice, the leakages can be implemented with shift and add operations instead of multiply operations, $$U=U+[U>>\text{LEAK}]$$

$$V=V+[V>>\text{LEAK}].$$

What is claimed is:

1. In a communications receiver having a feedback equalizer filler including filter coefficients, said communications receiver responsive to a received signal, said communications receiver further having an input filter responsive to said received signal to form soft decision samples corresponding to said received signal, and a slicer responsive to said received signal to form hard decision samples corresponding to said received signal, said soft decision samples and said hard decision samples comprising a series of individual signal samples, a method for operating said feedback equalizer filter comprising;

operating said feedback equalizer filter in a first mode by coupling said soft decision samples to said feedback equalizer filter;

operating said feedback equalizer filter in a second mode by coupling said hard decision samples to said feedback equalizer filter;

operating said feedback equalizer filter in said first node during a signal acquisition period;

operating said feedback equalizer filter in said second mode during a signal tracking period;

switching from said second mode to said first mode responsive to a first individual signal sample;

switching back from said first mode to said second mode responsive to a second individual signal sample, and     wherein the steps of switching from said second mode to said first mode and switching back from said first mode to said second mode comprise switching between said first and second modes in accordance with the quality of said first and second individual signal samples, the steps of switching further comprising:

measuring the quality level of said first individual signal sample;

measuring the quality level of said second individual signal sample;

coupling an individual one of said soft decision samples to said feedback equalizer filter when said first individual signal sample is at a first quality level; and     coupling an individual one of said hard decision samples to said feedback equalizer filter when said second individual signal sample is at a second quality level, wherein said second quality level is greater than said first quality level.

2. A method in accordance with claim 1, wherein said individual signal samples are represented as constellation points in a complex plane, and wherein said first individual signal sample is at said first quality level when outside of a square region of said complex plane forming a square of width w, said square region of said complex plane being centered about the origin of said complex plane, and said second individual signal sample is at said second quality level when inside said square region of said complex plane.

3. A method in accordance with claim 2, further including evaluating a number of past signal samples from said series of individual signal samples forming a block of past signal samples wherein the width w of said square region of said complex plane is selected responsive to the qualities of said block of past signal samples.

4. A method in accordance with claim 1, wherein said individual signal samples are represented as constellation points in a complex plane, wherein said method includes calculating the least means squares error of said second individual sample, and wherein said first individual signal sample is at said first quality level when outside of a square region of said complex plane forming a square of width w, said square region of said complex plane being centered about the origin of said complex plane, and said second individual signal sample is at said second quality level when inside said square region of said complex plane and the least means squares armor of said second individual signal sample is less than a predetermined threshold level t.

5. A method in accordance with claim 4, wherein said predetermined threshold level t is represented as a reliability area comprising a region of said complex plane forming a circle centered on a second constellation point in said complex plane representing said second individual signal sample.

6. A method in accordance with claim 4, wherein said predetermined threshold level t is represented as a reliability area comprising a region of said complex plane forming a square centered on a constellation point in said complex plane representing said second individual signal sample.

7. A method in accordance with claim 4, further including evaluating a number of past signal samples from said series of individual signal samples forming a block of past signal samples wherein said predetermined threshold level t is selected responsive to the qualities of said block of past signal samples.

8. A method in accordance with claim 1, wherein said method includes calculating the constant modulus algorithm of the first individual signal sample, and wherein said first mode is a signal acquisition mode using said soft decision samples and said constant modulus algorithm to update said filter coefficients of said feedback equalizer filter.

9. A method in accordance with claim 1, wherein said method includes calculating the least means squares error of said second individual sample, and wherein said second mode is a signal tracking mode using said hard decision samples and the least means squares error to update said filter coefficients of said feedback equalizer filter.

10. In a communication receiver having a feedback equalizer filter including filter coefficients, said communications receiver responsive to a received signal, said communications receiver further having an input filter responsive to said received sigal to form soft decision samples corresponding to said received signal, and a slicer responsive to said received signal to form hard decision samples corresponding to said received signal, said soft decision samples and said hard decision samples comprising a series of individual signal samples, a decision feedback equalizer arrangement comprising:

a switch operable in a first mode to couple said feedback equalizer filter to said soft decision samples during a signal acquisition period, said switch further operable in a second mode, to couple said feedback equalizer filter to said hard decision samples during a signal tracking period; and     a switch control responsive to a first individual signal sample to operate said switch from said second mode to said first mode, and responsive to a second individual signal sample to operate said switch from said first mod second mode, and     wherein said feedback equalizer filter is operated in said first and second modes in accordance with the quality of said first and second individual signal samples, said feedback equalizer filter being operated in said first mode by said switch control when said first individual signal sample is at a first quality level, said feedback equalizer filter being operated in said second mode by said switch control when said second individual signal sample is at a second quality level, wherein said second quality level is greater than said first quality level.

11. A decision feedback equalizer arrangement in accordance with claim 10, wherein said individual signal samples are represented as constellation points in a complex plane, and wherein said first individual signal sample is at said first quality level when outside of a square region of said complex plane forming a square of width w, said square region of said complex plane being centered about the origin of said complex plane, and said second individual signal sample is at said second quality level when inside said square region of said complex plane.

12. A decision feedback equalizer arrangement in accordance with claim 11, further including means for evaluating a number of past signal samples from said series of individual signal samples forming a block of past signal samples wherein the width w of said square region of said complex plane is selected responsive to the qualities of a said block of past signal samples.

13. A decision feedback equalizer arrangement in accordance with claim 10, wherein said decision feedback equalizer arrangement further includes means for calculating the least means squares error of said second individual sample wherein said individual signal samples are represented as constellation points in a complex plane, and wherein said first individual signal sample is at said first quality level when outside of a square region of said complex plane forming a square of width w, said square region of said complex plane being centered about the origin of said complex plane, and said second individual signal sample is at said second quality level when inside said square region of said complex plane and the least means squares error of said second individual signal sample is less than a predetermined threshold level t.

14. A decision feedback equalizer arrangement in accordance with claim 13, wherein said predetermined threshold level t is represented as a reliability area forming a region of said complex plane comprising a circle centered on a second constellation point in said complex plane representing said second individual signal sample.

15. A decision feedback equalizer arrangement in accordance with claim 13, wherein said predetermined threshold level t is represented as a reliability area comprising a region of said complex plane forming a square centered on a constellation point in said complex plane presenting said second individual signal sample.

16. A decision feedback equalizer arrangement in accordance with claim 13, further including means for evaluating a number of past signal samples from said series of individual signal samples forming a block of past signal samples wherein said predetermined threshold level t is selected responsive to the qualities of said block of past signal samples.

17. A decision feedback equalizer arrangement in accordance with claim 10, further including means for calculating the constant modulus algorithm of the first individual signal samples, and wherein said first mode is a signal acquisition mode using said soft decision samples and said constant modulus algorithm to update said filter coefficients of said feedback equalizer filter.

18. A decision feedback equalizer arrangement in accordance with claim 10, further including means for calculating the least means squares error of said second individual sample, wherein said second mode is a signal tracking mode using said hard decision samples and said least means squares error to update said filter coefficients of said feedback equalizer filter.

* * * * *